United States Patent
Ter Braak

[11] Patent Number: 5,895,684
[45] Date of Patent: Apr. 20, 1999

[54] METHOD AND INSTALLATION FOR PREPARING A LIGHT CONFECTIONERY COMPOSITION

[75] Inventor: Johannes Gerardus Ter Braak, Delft, Netherlands

[73] Assignee: Ter Braak B.V., Rotterdam, Netherlands

[21] Appl. No.: 08/913,044

[22] PCT Filed: Mar. 7, 1996

[86] PCT No.: PCT/NL96/00107

§ 371 Date: Sep. 5, 1997

§ 102(e) Date: Sep. 5, 1997

[87] PCT Pub. No.: WO96/27296

PCT Pub. Date: Sep. 12, 1996

[30] Foreign Application Priority Data

Mar. 7, 1995 [NL] Netherlands ............... 9500453

[51] Int. Cl.[6] ............... A23G 3/00; A23G 3/02
[52] U.S. Cl. ............... 426/571; 426/572; 426/474; 426/660
[58] Field of Search ............... 426/571, 572, 426/660, 474, 564, 516, 447, 448; 99/348, 516, 473

[56] References Cited

U.S. PATENT DOCUMENTS

| | | | |
|---|---|---|---|
| 2,197,919 | 4/1940 | Bowman | 426/572 |
| 2,600,569 | 6/1952 | Oakes | 426/572 |
| 3,062,661 | 11/1962 | Doumak | 426/572 |
| 3,615,593 | 10/1971 | Patil | 426/660 |
| 3,985,909 | 10/1976 | Kirkpatrick | 426/572 |
| 3,985,910 | 10/1976 | Kirkpatrick | 426/572 |
| 4,001,457 | 1/1977 | Hegadorn | 426/572 |
| 4,004,040 | 1/1977 | Puta | 426/564 |
| 4,056,640 | 11/1977 | Otto | 426/660 |
| 4,104,412 | 8/1978 | Fischer et al. | 426/572 |
| 4,120,987 | 10/1978 | Moore | 426/572 |
| 4,251,561 | 2/1981 | Gajewski | 426/571 |
| 4,262,029 | 4/1981 | Kleiner et al. | 426/512 |
| 4,271,206 | 6/1981 | Fariel et al. | 426/572 |
| 4,272,558 | 6/1981 | Bouette | 426/660 |
| 4,273,793 | 6/1981 | Fariel et al. | 426/572 |
| 4,282,263 | 8/1981 | Barnes et al. | 426/572 |
| 4,345,947 | 8/1982 | Rundell et al. | 127/48 |
| 4,597,980 | 7/1986 | Bottcher et al. | 426/568 |
| 4,666,730 | 5/1987 | Mergelsberg | 426/572 |
| 4,774,100 | 9/1988 | Markwardt et al. | 426/572 |
| 4,837,039 | 6/1989 | Escola Gallart et al. | 426/572 |
| 4,867,999 | 9/1989 | Mergelsberg et al. | 426/572 |
| 4,924,764 | 5/1990 | Markwardt et al. | 99/348 |
| 5,030,469 | 7/1991 | Mergelsberg | 426/564 |
| 5,190,785 | 3/1993 | Oelsner | 426/577 |
| 5,451,419 | 9/1995 | Schwab et al. | 426/564 |

FOREIGN PATENT DOCUMENTS

| | | |
|---|---|---|
| 0 400 201 | 12/1990 | European Pat. Off. . |
| 2 274 688 | 1/1976 | France . |
| 2 562 909 | 10/1985 | France . |
| 876088 | 10/1981 | U.S.S.R. . |
| 2 178 639 | 2/1987 | United Kingdom . |

OTHER PUBLICATIONS

Bryselbout et al., "Guide technologique de la confiserie industrielle", 1984, pp. 544–547.

"Technological aspects of aerated sweets manufacture", *Confectionery Production*, vol. 41, No. 2, Feb. 1975, pp. 74, 75, 78–80.

*Primary Examiner*—Cynthia L. Nessler
*Attorney, Agent, or Firm*—Young & Thompson

[57] ABSTRACT

To prepare a light confectionery composition, a sugar-containing liquid dehydrated in a boiler is beaten together with a beating agent and compressed air in a beating vat under pressure, and the beaten composition is discharged discontinuously from the beating vat. To this end the beaten composition is fed discontinuously from the beating vat to a pressurized buffer tank in which the pressure is held essentially at a specific value, for example 2.8 bar, while the beaten composition is discharged continuously from the pressurized buffer tank and expanded.

2 Claims, 1 Drawing Sheet

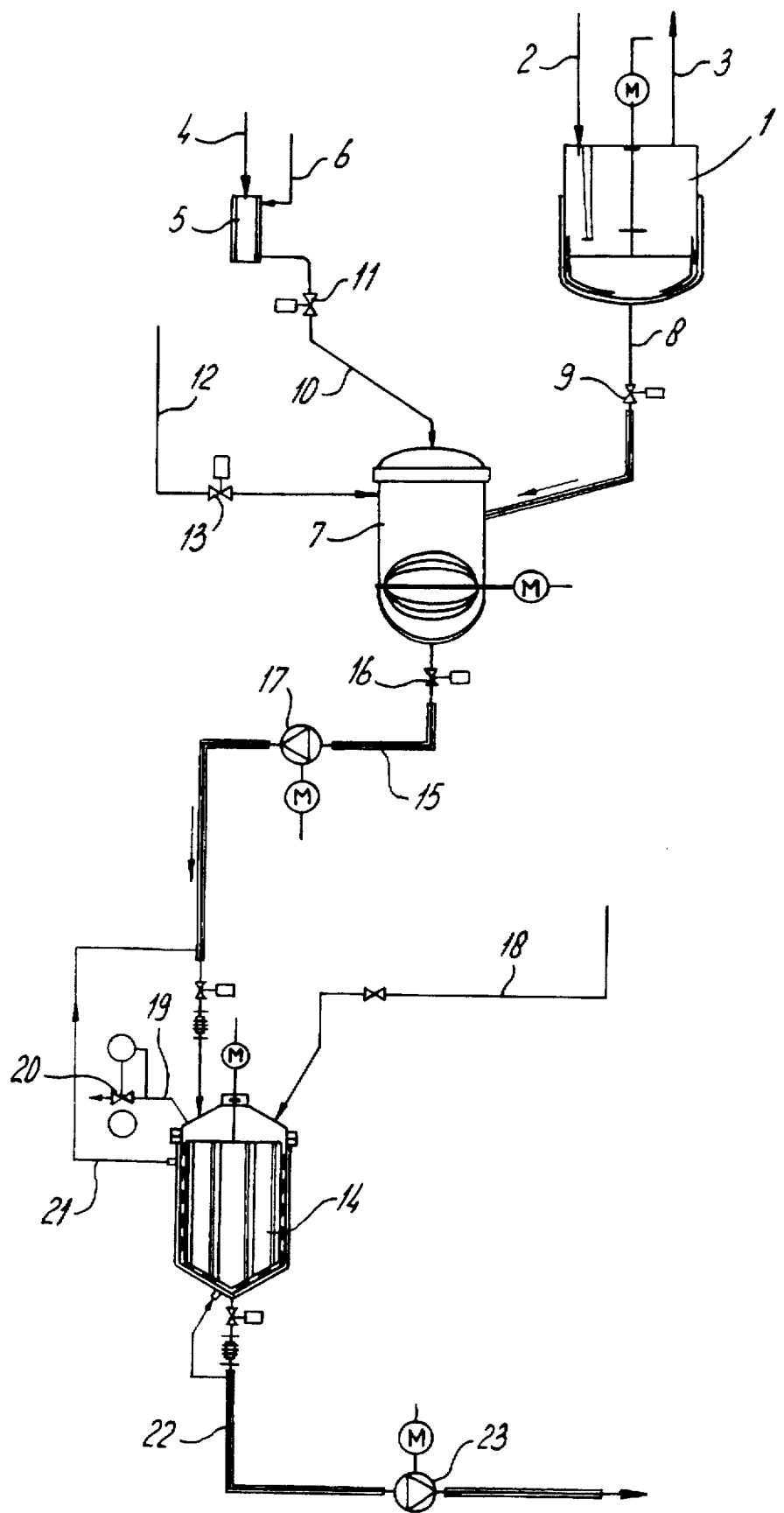

METHOD AND INSTALLATION FOR PREPARING A LIGHT CONFECTIONERY COMPOSITION

This application was filed under 35 USC 371 as a national stage application of PCT/NL96/00107, filed Mar. 7, 1996.

FIELD OF THE INVENTION

The invention firstly relates to a method for the preparation of a light confectionery composition, wherein a sugar-containing liquid, which has been dehydrated in a boiler, and a beating agent are beaten under pressure in a beating vat, and the beaten composition is discharged discontinuously from the beating vat.

BACKGROUND OF THE INVENTION

The problem on which the invention is based is that beating the sugar-containing liquid under excess pressure takes place discontinuously, whereas the discharge of the beaten confectionery composition will have to take place continuously with a view to further treatment or processing.

SUMMARY OF THE INVENTION

According to the invention, this problem is solved in that the beaten composition is fed discontinuously from the beating vat to a pressurized buffer tank in which the pressure is held essentially at a specific value (for example 2.8 bar), and in that the beaten composition is discharged continuously from the pressurized buffer tank and expanded.

An apparatus for carrying out the above-mentioned method comprises a beating vat, feed lines, opening into said vat, for, respectively, confectionery liquid, which has been dehydrated by boiling, beating agent and compressed air, and a valve arranged in each of said lines. The installation is characterized in that the discharge line from the beating vat opens into a pressurized buffer tank which is provided with means for keeping the pressure in said tank essentially constant and with a discharge line in which the beaten confectionery composition can be discharged in a continuous stream and can expand.

The means for keeping the pressure in the pressurized buffer tank essentially constant comprise a compressed air feed with a pressure regulating device and a pressure relief valve.

BRIEF DESCRIPTION OF THE DRAWINGS

The invention will now be explained in more detail below with reference to the figure, in which a diagram of the invention is shown.

DETAILED DESCRIPTION OF THE INVENTION

The following components can be differentiated in the FIGURE:

1=a boiler in which a sugar-containing liquid is boiled and dehydrated,
2=the feed line for the mixture of constituents of the confectionery liquid,
3=vacuum line leading to a vacuum pump, by means of which the pressure in the boiler 1 can be lowered and steam can be discharged,
4=feed line for beating agent,
5=heat exchanger for heating the beating agent,
6=line for hot water to the heat exchanger,
7=beating vat,
8=line between boiler and beating vat,
9=control valve in line 8,
10=line between heat exchanger 5 and beating vat 7,
11=control valve in line 10,
12=compressed air feed line to beating vat,
13=control valve in line 12,
14=pressurized buffer tank,
15=line between beating vat and pressurized buffer tank,
16=control valve in line 15,
17=conveyor pump in line 15,
18=compressed air feed to the pressurized buffer tank,
19=pressure relief line,
20=relief valve in pressure relief line,
21=hot water line,
22=discharge line for continuous discharge of light confectionery composition from the pressurized buffer tank 14, and
23=conveyor pump with expansion means.

It will be clear that sugar-containing liquid and beating agent fed into the beating vat 7 via the lines 8 and 10 are beaten in portions, beating being carried out with valves 9, 11 and 16 closed and valve 13 open and beating thus being carried out under pressure.

After opening the valve 16, the beaten, pressurized composition is fed via the line 15 to the pressurized buffer tank 14, in which the pressure is held essentially constant at about 2.8 bar by means of the compressed air line 18 and the relief valve 20.

The beaten confectionery composition is discharged under a pressure of 2.8 bar in a constant stream through a pump and expands to atmospheric pressure, a light composition being produced. Colorants, flavourings and fat can also be added to the composition thereafter or beforehand, in a manner which is not shown. Finally, the finished product is fed continuously to a pouring or shaping line or other processing line.

I claim:

1. Method for the preparation of a light confectionery composition, which comprises:

beating batch-wise a sugar-containing liquid dehydrated in a boiler, a beating agent and compressed air in a beating vat under pressure so as to obtain a beaten composition;

discharging the beaten composition discontinuously from the beating vat;

discontinuously feeding the beaten composition from the beating vat to the pressurized buffer tank in which the pressure is maintained essentially at a preselected value;

continuously discharging the beaten composition from the pressurized buffer tank by a pump; and continuously expanding the beaten composition downstream of the pump to atmospheric pressure to obtain the light confectionery composition.

2. The method according to claim 1, wherein the pressurized buffer tank is maintained at a pressure of about 2.8 bars.

* * * * *